United States Patent

Hershberg

[15] 3,648,178

[45] Mar. 7, 1972

[54] MULTIPLEX FM TRANSMITTER

[72] Inventor: David E. Hershberg, Ridgewood, N.J.

[73] Assignee: International Telephone and Telegraph Corporation, Nutley, N.J.

[22] Filed: Sept. 4, 1969

[21] Appl. No.: 855,111

[52] U.S. Cl. ....................325/145, 179/15 BP, 325/45, 325/47, 332/21

[51] Int. Cl. ....................H04j 1/14, H04j 1/20, H04b 1/02

[58] Field of Search ....................179/15 BP; 325/45, 46, 47, 325/48, 62, 145; 332/21

[56] References Cited

UNITED STATES PATENTS

| | | | |
|---|---|---|---|
| 2,924,703 | 2/1960 | Sichak et al. | 325/31 |
| 3,271,679 | 9/1966 | Fostoff | 325/31 |
| 3,444,469 | 5/1969 | Miyagi | 325/46 |
| 3,449,525 | 6/1969 | Berry et al. | 179/15 |
| 3,477,042 | 11/1969 | Wachs | 332/16 |

*Primary Examiner*—Robert L. Richardson

*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A first variable attenuator is coupled between the FDM baseband source and the FM modulator. The output signal of the first attenuator is RMS detected to provide a control signal for this attenuator to adjust the amplitude of the baseband signal applied to the FM modulator and, hence, the frequency deviation thereof. An increase in frequency deviation enables a reduction in the EIRP (effective isotropic radiated power) for the same S/N, or an increase in S/N for the same EIRP. A second variable attenuator controlled by the same control signal operates in an inverse fashion, as compared to the first variable attenuator, on the carrier amplitude to maintain a constant S/N ratio.

5 Claims, 1 Drawing Figure

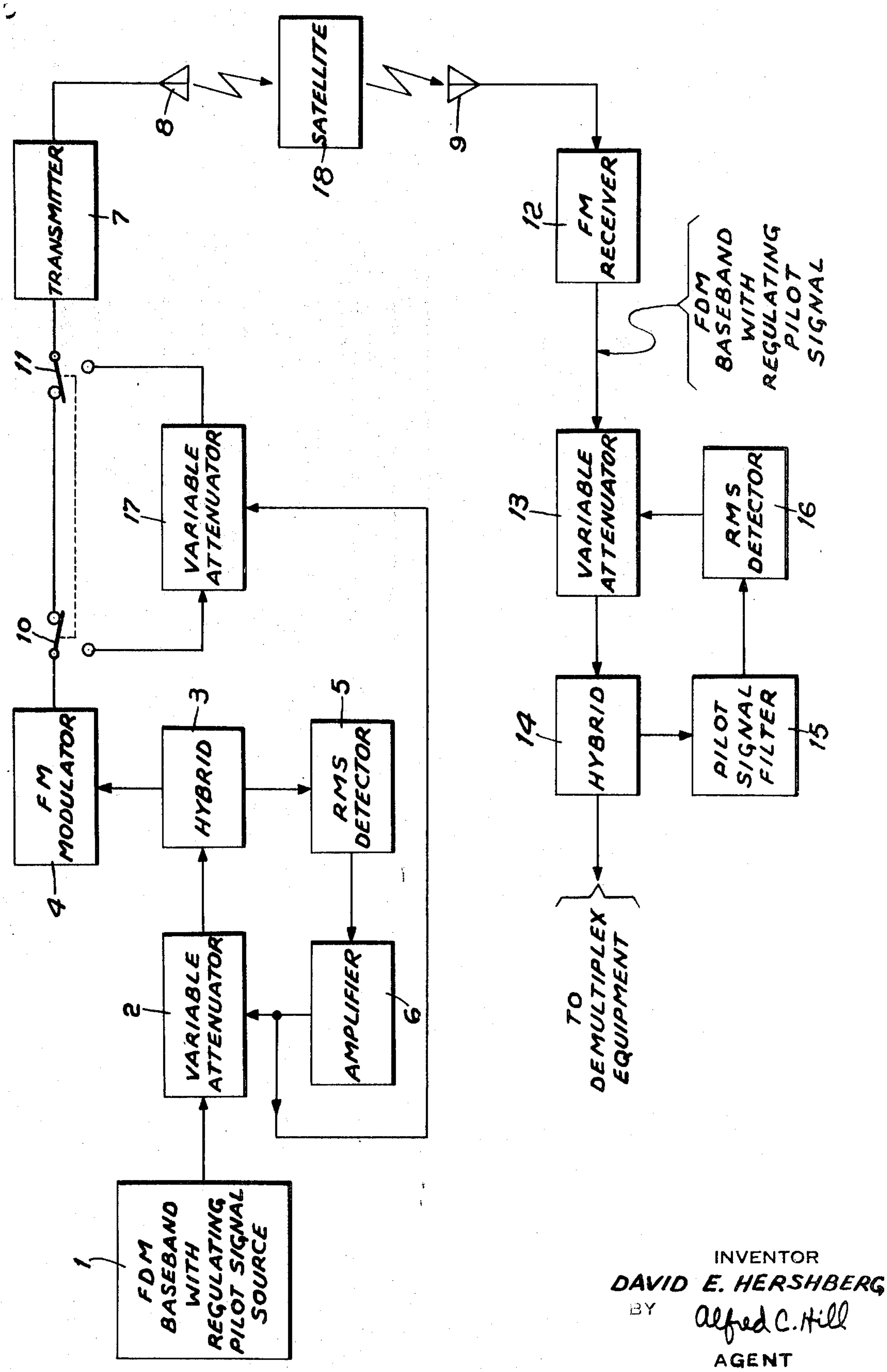
INVENTOR
DAVID E. HERSHBERG
BY Alfred C. Hill
AGENT

MULTIPLEX FM TRANSMITTER

BACKGROUND OF THE INVENTION

This invention relates to FM (frequency modulation) communication systems and more particularly to a FM transmitter employed therein.

SUMMARY OF THE INVENTION

An object of the present invention is to provide a FM transmitter having automatic adjustable baseband level.

Another object of the present invention is to provide a FM transmitter having both adjustable baseband level and adjustable carrier amplitude (EIRP) in order to maintain a constant S/N (signal-to-noise) ratio.

Still another object of the present invention is to provide a FM transmitter enabling a reduction in the EIRP requirements for a communication type satellite system.

A feature of the present invention is the provision of a frequency modulation transmitter comprising a source of frequency division multiplex baseband signal; a frequency modulator to frequency modulate a carrier signal; first means coupled between the source and the modulator responsive to the amplitude of the baseband signal at the output of the first means to adjust the amplitude of the baseband signal prior to coupling to the modulator to thereby enable control of the baseband level; and second means coupled to the modulator to transmit the output signal of the modulator.

Another feature of the present invention is the provision of a third means coupled between the above-mentioned modulator and the above-mentioned second means responsive to the amplitude of the baseband signal at the output of the first means to adjust the amplitude of the carrier signal at the output of the modulator opposite to the adjustment of the amplitude of the baseband signal by the first means to maintain the signal-to-noise ratio constant.

BRIEF DESCRIPTION OF THE DRAWING

The above-mentioned and other features and objects of this invention and the manner of obtaining them will become more apparent by reference to the following description taken in conjunction with the drawing, the single FIGURE is a block diagram of an FDM/FM communication system employing a FM transmitter in accordance with the principles of the present invention.

DESCRIPTION OF THE PREFERRED EMBODIMENT

In any FM communication system equation (1) below determines the performance of the FM communication system above FM threshold.

$$S/N=k_1C/NM^2 \quad (1)$$

where $k_1$= a proportionality constant, $C/N$= the carrier-to-noise ratio at some place in the FM system, and $M$= the per channel frequency deviation of the FDM baseband signal. The system designer optimizes the FM system considering the threshold margin required and adjusting the received carrier level and the per channel modulation index. The composite FDM modulation of the FM carrier during a small percentage of the telephone busy hour is used to determine the RF (radio frequency) bandwidth of the system and, hence, is the determining factor for the threshold of the system. This threshold occurs at approximately a 5db. (decibels) $C/N$ ratio in this bandwidth.

What this means is that for most of the time in any FDM/FM telephone system, the amount of carrier is adjusted to a level that with the $M$ determined by full carrier loading (all channels being modulated) gives the specified $S/N$ ratio.

The specified $S/N$ ratio, according to the CCIR (International Radio Consultive Committee) recommendation number 353, is met when the $S/N$ ratio exceeds 50db. for 80 percent of the time. It is known from the characteristics of an FM system that the same $S/N$ ratio can be achieved at a lower carrier level by increasing the modulation index. This, of course, cannot be done indiscriminately, since in a FM system with a fixed RF bandwidth and threshold, distortion will occur if the frequency deviation is increased beyond a given point. Since RF bandwidth is always determined to allow for a tolerable level of distortion at the busy hour, i.e., when all channels are busy, the individual channels, at other than the busy hour, being used could be operated at a higher frequency deviation and keeping the overall composite at the same carrier level as in the busy hour there is provided a higher $S/N$ ratio.

As an example, if the specified $S/N$ ratio of a FM system is 50db. and the deviation of the system is set to provide this value at a given $C/N$ ratio, the following can be done: (1) reduce the carrier power 50 percent; (2) control the deviation of each channel over a range from 0.5 times nominal to 2 times nominal or greater at least 80 percent of the time; and (3) maintain the composite deviation due to the FDM baseband at 0.5 nominal at all times so that the required RF bandwidth is reduced and the system margin remains the same. This will make the busy hour $S/N$ ratio 44db. if carrier level remains the same.

Referring to the FIGURE, the foregoing can be accomplished by the simple apparatus illustrated. Source 1 provides the FDM baseband with a regulating pilot signal which is applied to variable attenuator 2. These signals are amplitude controlled and coupled through hybrid 3 to FM modulator 4. Hybrid 3 enables the output of attenuator 2 to also be detected in RMS (root-mean-square) detector 5 whose output is coupled through amplifier 6 to attenuator 2 to control the attenuation provided thereby.

During the busy hour all the channels of the FDM baseband signal will be modulated and detector 5 will provide the highest output which will cause attenuator 2 to provide the most attenuation. When a quiet hour occurs and certain of the channels are not being utilized, the output from detector 5 will decrease, thereby decreasing the attenuation of attenuator 2. This results in an increase in the per channel modulating signal amplitude of the used channels. This in turn operates upon FM modulator 4 to provide a greater per used channel frequency deviation for the carrier signal. Thus, $M$ of equation (1) will increase, and with the same $C/N$ ratio, the $S/N$ ratio will accordingly increase, thereby reducing the requirement on the EIRP for achieving an increased $S/N$ ratio. Also, since $$EIRP=k_2C/N \quad (2)$$

where $k_2$= a second proportionality constant, an increase in $M$ will enable a reduction in the $C/N$ ratio to maintain the same $S/N$ ratio, thereby resulting in a reduction in the $EIRP$.

Modulator 4 may include a precision oscillator to provide a subcarrier signal and the modulation portion thereof could be a variable capacitance diode so as to modulate the subcarrier signal. The resultant modulated signal from modulator 4 is coupled to transmitter 7 and, hence, by antenna 8 to antenna 9 in the FM system receiver with switches 10 and 11 in the position illustrated.

Transmitter 7 would be a conventional transmitter having a heterodyne arrangement to up-convert the subcarrier frequency and its modulation to the desired transmitter frequency value, and a power amplifier for coupling the up-converted signal to antenna 8 for transmission to satellite 17.

The FM signal received at antenna 9 from satellite 17 is coupled to FM receiver 12 which is a conventional FM receiver including a down converter heterodyne arrangement, necessary RF amplifiers preceding this down conversion and a conventional FM detector to recover the FDM baseband with the regulating pilot signal supplied from source 1. This regulating pilot signal, of course, has been subjected to the attenuation of attenuator 2 and, hence, its amplitude will be proportional to the attenuator 2. The pilot signal is coupled through variable attenuator 13 to hybrid 14, together with the FDM baseband which is coupled to the demultiplex equipment. The pilot signal at the other output of hybrid 14 is detected by pilot signal filter 15 and detected in RMS detector 16 to generate a control signal to operate upon attenuator 13 to provide an automatic gain control (AGC) for the received FDM baseband signals in a conventional known manner.

As pointed out hereinabove with respect to attenuator 2, detector 5 produces a control signal proportional to the RMS amplitude of the composite FDM baseband signal which will enable an increase in M as the number of used channels decrease. As pointed out, this could result in an increase in *S/N* ratio with constant *C/N* ratio, or the maintenance of the same *S/N* ratio with a corresponding decrease in the *C/N* ratio. To accomplish the maintenance of a constant *C/N* ratio as the frequency deviation *M* is adjusted by attenuator 2, the control signal from amplifier 6 is coupled to variable attenuator 17 which is coupled by switches 10 and 11 positioned against their other contacts to be placed between modulator 4 and transmitter 7. With attenuator 17 arranged to have an inverse attenuation ratio with respect to the attenuation provided by attenuator 2, as the attenuation is decreased in attenuator 2 the control signal produced by detector 5 causes attenuator 17 to increase its attenuation to thereby reduce the carrier level so that the *S/N* ratio remains constant.

The degree of application of the system disclosed herein is as a function of the telephone user statistics. However, it is believed for the majority of the present communication satellite circuits, at least a 3db. improvement can be realized. The economic advantages for an earth station user are great. As an example, the amount of satellite *EIRP* and the bandwidth required for 60 channels can now support 132 channels.

While the description of the present invention has been with regard to a satellite communication system, it is not meant to limit the present invention to such a communication system, since the arrangement is applicable to any FDM communication system. However, the present invention is particularly advantageous in a satellite communication system, and in particular, the transmitter carried by the satellite itself, since there is a reduced demand on the solar cells providing the power for the satellite transmitter, the addition to conventional transmitter circuitry proposed by the present invention is small, and could easily be installed at present ground station.

While I have described above the principles of my invention in connection with specific apparatus, it is to be clearly understood that this description is made only by way of example.

I claim:

1. A frequency modulation transmitter comprising:
a source of frequency division multiplex baseband signal;
a frequency modulator to frequency modulate a carrier signal;
first means coupled between said source and said modulator responsive to the amplitude of said baseband signal at the output of said first means to adjust the amplitude of said baseband signal prior to coupling to said modulator to thereby enable control of the baseband level;
second means coupled to said modulator to transmit the output signal of said modulator; and
third means coupled between said modulator and said second means responsive to the amplitude of said baseband signal at the output of said first means to adjust the amplitude of said carrier signal at the output of said modulator opposite to the adjustment of the amplitude of said baseband signal by said first means to maintain the signal-to-noise ratio constant.

2. A transmitter according to claim 1, wherein
said third means includes
a variable amplitude control means coupled between said modulator and said second means.

3. A transmitter according to claim 2, wherein
said control means includes
a variable attenuator.

4. A transmitter according to claim 1, wherein
said first means includes
a first variable amplitude control means coupled between said source and said modulator, and
a root-mean-square detector coupled to the output of said first control means to produce a control signal to control said first control means for adjustment of the amplitude of said baseband signal; and
said third means includes
a second variable amplitude control means coupled between said modulator and said second means and to said detector responsive to said control signal to provide said adjustment of said carrier signal at the output of said modulator.

5. A transmitter according to claim 4, wherein
said first control means includes
a first variable attenuator having a given attenuation characteristic; and
said second control means includes
a second variable attenuator having an attenuation characteristic opposite said given attenuation characteristic.

* * * * *